Aug. 22, 1967   J. L. A. GARSCIA   3,337,711
METHOD OF WELDING METAL BODIES SEPARATED BY AN ADHESIVE LAYER
Filed May 10, 1966

Janusz L. A. Garscia
INVENTOR.

BY
Karl F. Ross
Attorney

United States Patent Office 3,337,711
Patented Aug. 22, 1967

3,337,711
METHOD OF WELDING METAL BODIES
SEPARATED BY AN ADHESIVE LAYER
Janusz L. A. Garscia, Juliana Bruna Str. 12/19,
Warsaw 12, Poland
Filed May 10, 1966, Ser. No. 548,836
Claims priority, application Poland, May 15, 1965,
P 109,111
1 Claim. (Cl. 219—92)

ABSTRACT OF THE DISCLOSURE

This disclosure relates to the adhesive/welding attachment of metallic bodies and involves a method of joining such bodies by initially connecting them with a conductive shunt while passing a current through the bodies and the shunt-series to render the adhesive flowable, applying concurrently with the resistance heating of the bodies via this shunt to extrude the adhesive away from the pressurized region, and thereafter passing a welding current between the bodies through contacting portions at this welded region and removing the shunt to permit the welded junction to serve as the electrical connection between the bodies.

---

The invention relates to a method of resistance welding two bodies or layers through a glue layer present in solid state.

In manufacturing processes so-called "weld-glue" joints are commonly utilized for connecting separate parts of a metallic construction. In glue-weld joints the essential load-bearing and stress-resisting function is performed by glue, the welds serving to apply the pressure technologically necessary for the hardening of the glue.

Until now, in order to form welds in glue-weld joints holes were cut out of the glue layer, through which holes the joined parts were welded. Another method consisted in welding joined parts beneath the adhesive layer inserted between said parts. Both methods were not free from some inconveniences.

Welding through specially formed holes required an exact location of the holes with respect to the welder electrodes; thus jigs, templates and other pattern devices were necessary. Welding beneath the glue layer, on the other hand, did not provide the necessary pressure over the whole surface of the glue.

The object of this invention is to provide a method of joining metallic bodies whereby the aforementioned disadvantages can be avoided.

These inconveniences can be eliminated by the method of the present invention, as welding of joined parts is here performed directly through the glue layer. This is achieved in such way that, during the welding of the adhesively joined elements, between them a layer of glue in solid state is inserted, these elements are connected by means of a shunting element which secures the passage of current. The passing current heats the thermally flowable adhesive or glue at the place where the electrode presses the glue, thereby squeezing it out until the joined parts come into contact. After their contacting, the joined parts are bonded by welding. The already executed welds act as the shunt when successive welds are being made, so the primary shunting element can be disconnected.

The specified method is very simple and does not demand additional tooling.

Figure 1:
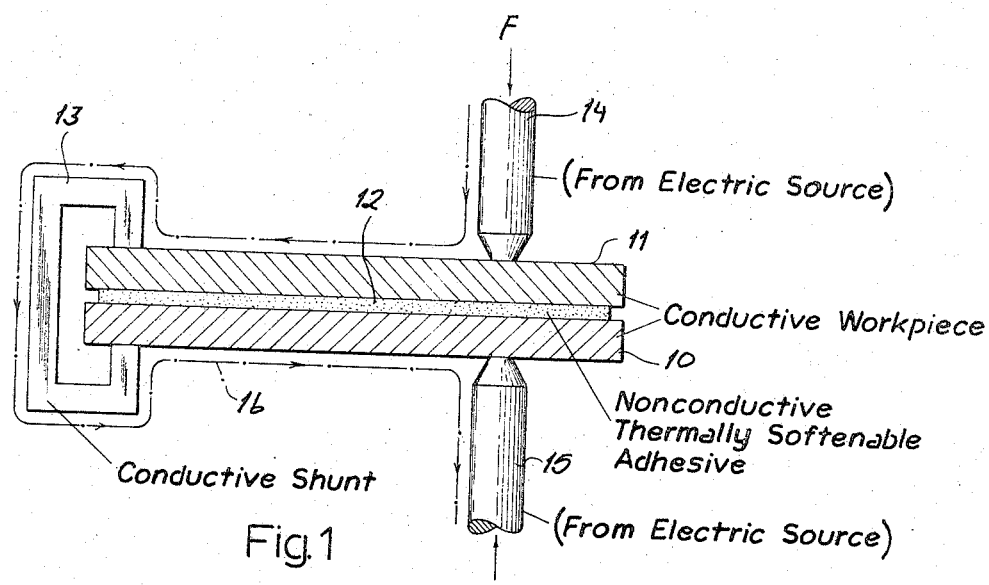
Figure 2:
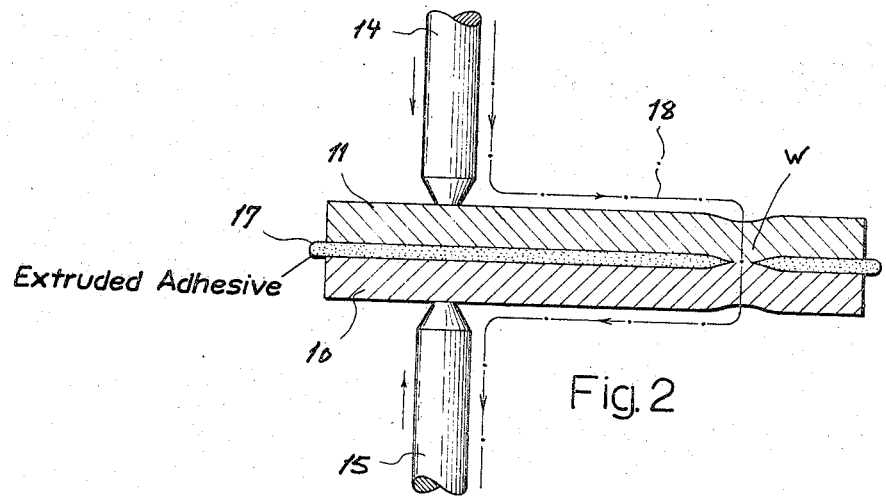

This object and other features and advantages of the present invention will become more readily apparent from the following description, reference being made to the accompanying drawing in which:

FIG. 1 is a diagrammatic cross-sectional view illustrating a first step in the process; and FIG. 2 is a view similar to FIG. 1 but illustrating further steps.

In the drawing, I show a pair of conductive workpieces 10 and 11 which sandwich between them a nonconductive but thermally softenable adhesive 12 which bars the direct flow of a resistance-heating electric current between the bodies. Thus, in accordance with this invention, the bodies are electrically connected by a conductive shunt member 13 (FIG. 1) so that when the electrodes 14 and 15 bear against the bodies 10, 11 with forces F and apply a resistive-heating electric current thereto, the current flows through the bodies and the shunt in series as represented by the dot-dash line 16 in this figure. The solid adhesive 12 is then softened and extruded away (at 17) from the pressurized region W (FIG. 2). Upon contact of the bodies in this region, the continuation of current flow from the electrodes forms a weld which, upon removal of the shunt and the engagement of another portion of the conductive bodies between the electrodes, serves to electrically connect the bodies for passage of the resistance-heating current (dot-dash line 18 in FIG. 2).

What we claim is:

A method of joining a pair of electrically conductive metallic bodies comprising the steps of:
(a) sandwiching between said bodies a solid nonconductive thermally softenable adhesive layer preventing electrical connection of said bodies;
(b) electrically connecting said bodies externally of said layer by applying to them an electrically conductive shunt;
(c) compressing said bodies at a location spaced from said shunt between a pair of electrodes while passing a resistive-heating current through said electrodes whereby said current flows through said bodies and said shunt in series and around said layer, thereby heating said layer and softening same;
(d) continuing the passage of said electric current through said bodies and said shunt while softening said layer and urging said bodies together to extrude said layer in the region of said electrode and bringing said bodies into direct electrical contact at said region;
(e) welding said bodies together upon their mutual electrical contact at said region thereby forming an electrical bypass for the shunt;
(f) urging said electrodes against said bodies at a region spaced from the weld formed in step (e) while passing a resistive-heating electric current through said bodies and said weld in series to heat said layer and extrude it from the region at which said electrodes apply pressure to said bodies and thereby form at least one further weld between said bodies.

References Cited

UNITED STATES PATENTS

| | | | |
|---|---|---|---|
| 2,726,308 | 12/1955 | Cinnamon | 219—91 |
| 2,970,204 | 1/1961 | Piceu et al. | 219—92 |
| 3,181,235 | 5/1965 | Wallis et al. | 29—484 |

FOREIGN PATENTS 825,910  12/1937  France.

RICHARD M. WOOD, *Primary Examiner.*